United States Patent
Tran et al.

(10) Patent No.: US 7,624,878 B2
(45) Date of Patent: Dec. 1, 2009

(54) FATTY ACID BY-PRODUCTS AND METHODS OF USING SAME

(75) Inventors: Bo L. Tran, Chicago, IL (US); Dmitri L. Kouznetsov, Aurora, IL (US)

(73) Assignee: Nalco Company, Naperville, IL (US)

( * ) Notice: Subject to any disclaimer, the term of this patent is extended or adjusted under 35 U.S.C. 154(b) by 467 days.

(21) Appl. No.: 11/355,469

(22) Filed: Feb. 16, 2006

(65) Prior Publication Data

US 2007/0187301 A1   Aug. 16, 2007

(51) Int. Cl.
*B03D 1/008* (2006.01)
*B03D 1/018* (2006.01)
*B03D 1/02* (2006.01)

(52) U.S. Cl. .................... 209/166; 209/167

(58) Field of Classification Search ........... 209/166, 209/167
See application file for complete search history.

(56) References Cited

U.S. PATENT DOCUMENTS

| | | | | |
|---|---|---|---|---|
| 2,163,702 | A * | 6/1939 | Ried ................. | 209/166 |
| 2,377,129 | A * | 5/1945 | Christmann et al. ....... | 209/166 |
| 4,148,720 | A | 4/1979 | Wang et al. | |
| 4,233,150 | A | 11/1980 | Wang et al. | |
| 4,340,467 | A | 7/1982 | Wang et al. | |
| 4,589,980 | A | 5/1986 | Keys | |
| 4,678,562 | A | 7/1987 | Keys | |
| 4,915,825 | A * | 4/1990 | Christie et al. ............. | 209/166 |
| 6,799,682 | B1 | 10/2004 | Yoon | |
| 6,871,743 | B2 | 3/2005 | Yoon | |
| 2003/0146134 | A1 * | 8/2003 | Yoon ................. | 209/164 |
| 2005/0269248 | A1 * | 12/2005 | Cameron et al. ......... | 209/166 |

FOREIGN PATENT DOCUMENTS

BR         9302739        *  1/1995
WO    WO 2004098782 A1  * 11/2004

OTHER PUBLICATIONS

Kirk-Othmer, A Wiley-Interscience Publication; Encyclopedia Of Chemical Technology, Fourth Edition, 1994.

* cited by examiner

*Primary Examiner*—Thomas M Lithgow
(74) *Attorney, Agent, or Firm*—Benjamin E. Carlsen; Michael B. Martin

(57) ABSTRACT

Methods and compositions for separating materials are provided. In an embodiment, the present invention provides a method of separating a first material from a second material. For example, the method can comprise mixing the first material and the second material in a slurry with a beneficiation composition. The beneficiation composition can comprise one or more fatty acid by-products derived from a biodiesel manufacturing process and one or more green collectors. Air bubbles can be provided in the slurry to form bubble-particle aggregates with the first material and the bubble-particle aggregates can be allowed to be separated from the second material.

15 Claims, No Drawings

FATTY ACID BY-PRODUCTS AND METHODS OF USING SAME

BACKGROUND

The present invention relates generally to beneficiation technologies. More specifically, the present invention relates to beneficiation compositions and methods of using same.

Beneficiation is a method of separating useful matter from waste. Commonly, beneficiation uses the difference in the hydrophobicity of the respective components. During this process, the mineral ore is comminuted to a certain small size and slurried with water. The slurry is introduced into a flotation apparatus purged with air. The air preferentially attaches to the hydrophobic particles of the slurry, making them float to the top of the apparatus. The floated particles are collected, dewatered, and accumulated as a sellable final product. The hydrophilic particles tend to migrate to the bottom of the contact vessel from where they can be removed as tailings and processed into waste impoundments. In other processes, such as reverse flotation, the sellable final product may migrate to the bottom.

To facilitate beneficiation, several types of conventional reagents are used such as frothers, collectors, promoters and conditioners. Nevertheless, these reagents can be expensive and toxic thereby reducing the cost-effectiveness of the beneficiation processes.

It is therefore desirable to provide and utilize cost-effective, -effective, and environmentally friendly or green beneficiation compositions.

SUMMARY

The present invention relates generally to beneficiation technologies. More specifically, the present invention relates to beneficiation compositions and methods of using same.

In an embodiment, the present invention provides a method of separating a first material from a second material. For example, the method can comprise mixing the first material and the second material in a slurry with a beneficiation composition. The beneficiation composition can comprise one or more fatty acid by-products derived from a biodiesel manufacturing process and one or more green or environmentally friendly collectors. The beneficiation composition can also comprise one or more green collectors and one or more fatty acid by-products of transesterification reactions involving triglycerides. Air bubbles can be provided in the slurry to form bubble-particle aggregates with the first material and the bubble-particle aggregates can be allowed to be separated from the second material.

In an embodiment, the green collector can be selected from the group consisting of nonionic surfactants of low HLB numbers, naturally occurring lipids, modified lipids, hydrophobic polymers and combinations thereof. "Green" means environmentally friendly, biodegradable, non-combustible, non-hazardous, and/or non-toxic chemistry.

In an embodiment, the fatty acid by-product can be derived from the addition of acid to the fatty acid salts solution of a crude fatty acid alkyl esters phase during the biodiesel manufacturing process and/or derived from the addition of acid to the fatty acid salts solution of a crude glycerin phase during the biodiesel manufacturing process. For example, the fatty acid by-product can be derived from the biodiesel manufacturing process by adding acid to the bottom effluent of the esterification stage and/or by adding acid to the wash water (e.g. soap water) of the ester product. The fatty acid by-product can also be derived from the acidulation of any of the biodiesel manufacturing process streams containing one or more fatty acid salts component.

In an embodiment, the fatty acid by-product comprises about one to about 50 weight percent of one or more methyl esters and about 50 to about 99 percent of one or more fatty acids.

In an embodiment, the fatty acid by-product further comprises one or more components selected from the group consisting of methyl esters, salts, methanol, glycerin, water and combinations thereof.

In an embodiment, the free fatty acids comprise one or more components selected from the group consisting of palmitic acid, palmitoleic acid, stearic acid, oleic acid, linoleic acid, linolenic acid, arachidic acid, eicosenoic acid, behenic acid, lignoceric acid, tetracosenic acid and combinations thereof.

In an embodiment, the fatty acid by-product comprises one or more components selected from the group consisting of $C_6$-$C_{24}$ saturated and unsaturated fatty acids, $C_6$-$C_{24}$ saturated and unsaturated fatty acids salts, methyl esters, ethyl esters and combinations thereof.

In an embodiment, the fatty acid by-product further comprises one or more components selected from the group consisting of $C_2$-$C_6$ mono-, di- and tri-hydric alcohols and combinations thereof.

In an embodiment, the fatty acid by-product further comprises one or more inorganic salts.

In another embodiment, the present invention provides a method of separating hydrophobic and hydrophilic particles in an aqueous slurry. For example, the method can comprise adding a beneficiation composition to the aqueous slurry to increase the hydrophobicity of the hydrophobic particles. The beneficiation composition can comprise one or more fatty acid by-products derived from a biodiesel manufacturing process and one or more green collectors. The aqueous slurry can be mixed to assist the fatty acid by-product in adsorbing on the surface of the hydrophobic particles so as to increase the hydrophobicity of the hydrophobic particles. Air bubbles can be provided to the aqueous slurry so that the hydrophobic particles collect on the surface of the air bubbles forming bubble-particle aggregates. The bubble-particle aggregates can be allowed to float to the surface of the aqueous slurry to be separated from the hydrophilic particles.

In an alternative embodiment, the present invention provides a beneficiation composition comprising one or more fatty acid by-products derived from a biodiesel manufacturing process and one or more green collectors.

In another embodiment, the present invention provides a beneficiation composition comprising one or more green collectors and one or more fatty acid by-products of transesterification reactions involving triglycerides.

An advantage of the present invention is to provide cost-effective methods of separating two or more materials.

Another advantage of the present invention is to provide hydrophobicity enhancing compositions that can be used in flotation processes that have improved cost-savings.

Additional features and advantages are described herein, and will be apparent from, the following Detailed Description.

DETAILED DESCRIPTION

The present invention relates generally to beneficiation technologies. More specifically, the present invention relates to beneficiation compositions and methods of using same.

In the present specification, the term "beneficiation" should be understood to mean separating useful matter from waste, particularly hydrophobic substances from hydrophilic substances. Suitable processes for accomplishing this include, but are not limited to, flotation, reverse flotation and similar technologies.

In the present specification, the term "by-products" should be understood to mean by-products derived from biodiesel manufacturing processes, and/or transesterification reactions involving triglycerides.

In an embodiment, the present invention provides beneficiation compositions comprising by-products of biodiesel manufacturing. The by-products of biodiesel manufacturing can comprise, for example, mixtures of straight-chain, monocarboxylic acids containing from 6 to 24 carbon atoms.

The by-products of biodiesel manufacturing of the present invention were surprisingly found to be effective as reagents for use in beneficiation technologies such as, for example, flotation processes. In addition, these by-products are generally environmentally benign and non-hazardous. The by-products are also non-combustible and can provide benefits in applications where there is a "high" flash point requirement. The by-products can be used to supplement or replace conventional hazardous collectors for flotation processes such as diesel fuel thereby reducing the dependency on such environmentally unfriendly materials. Diesel fuel is used ubiquitously in the mineral processing industry. A good portion of the spent diesel from the processes is injected underground posing an environmental and human health hazard. The present invention offers an added benefit of not posing any environmental and/or human health hazard if discharged underground.

Biodiesel is a cleaner-burning diesel replacement fuel made from natural, renewable sources. For example, biodiesel can include fatty acid alkyl esters used as a cleaner-burning diesel replacement fuel made from sources such as new and used vegetable oils and animal fats.

According to the American Fuel Data Center of the U.S. Department of Energy, approximately 55% of the biodiesel is currently produced from recycled fat or oil feedstock, including recycled cooking grease. The other half of the industry is limited to vegetable oils, the least expensive of which is soy oil. The soy industry has been the driving force behind biodiesel commercialization because of excess production capacity, product surpluses, and declining prices. Similar issues apply to the recycled grease and animal fats industry, even though these feedstocks are less expensive than soy oils. Based on the combined resources of both industries, there is enough of the feedstock to supply 1.9 billion gallons of biodiesel.

Biodiesel can be made through a chemical process called transesterification in which vegetable oil or animal fats are converted to fatty acid alkyl esters, glycerin and remaining compounds from which the fatty acid by-products are derived. Such oils and fats include, for example, tallow, crude tall oil, coconut oil, rapeseed oil, canola oil, palm kernel oil and soybean oil. Triglycerides, the principal components of animal fats and of vegetable oils, are esters of glycerol, a trihydric alcohol, with fatty acids of varying molecular weight. Three synthetic pathways can be used to produce fatty acid alkyl esters from oils and fats:

base-catalyzed transesterification of the oil;
    direct acid-catalyzed esterification of the oil; and
    conversion of the oil to fatty acids and subsequent esterification to biodiesel.

The majority of fatty acid alkyl esters are produced by the base-catalyzed method. In general, the catalyst used for transesterification of the oil to produce biodiesel commercially can be typically any base, most preferably sodium hydroxide or potassium hydroxide.

In the biodiesel manufacturing process, the oils and fats can be filtered and preprocessed to remove water and contaminants. If free fatty acids are present, they can be removed or transformed into biodiesel using special pretreatment technologies, such as acid catalyzed esterification. The pretreated oils and fats can then be mixed with an alcohol and a catalyst (e.g. base). The base used for the reaction is typically sodium hydroxide or potassium hydroxide, being dissolved in the alcohol used (typically ethanol or methanol) to form the corresponding alkoxide, with standard agitation or mixing. It should be appreciated that any suitable base can be used. The alkoxide may then be charged into a closed reaction vessel, and the oils and fats are added. The system can then be closed, and held at about 71° C. (160° F.) for a period of about 1 to 8 hours, although some systems recommend that the reactions take place at room temperature.

Once the reactions are complete the oil molecules (e.g. triglycerides) are broken apart and two major products are produced: 1) a crude fatty acid alkyl esters phase (i.e. biodiesel phase) and 2) a crude glycerin phase. Typically, the crude fatty acid alkyl esters phase forms a layer on top of the denser crude glycerin phase. Because the glycerol phase is more dense than the biodiesel phase, the two can be gravity separated, for example, with the glycerol phase simply drawn off the bottom of a settling vessel. In some cases, a centrifuge may be employed to speed the separation of the two phases.

In an embodiment, the fatty acid by-products can originate from the refining of the crude fatty acid alkyl esters phase and/or the crude glycerin phase during the biodiesel manufacturing process. For example, the crude fatty acid alkyl esters phase typically includes a mixture of fatty acid alkyl esters, water and a fatty acid salts component. These fatty acid salts component generally form a solution with the water phase (e.g. soap water) where they can be further separated from the fatty acid alkyl esters component. Once separated from the fatty acid alkyl esters component, any suitable acid such as, for example, hydrochloric acid can be added to the water phase containing the fatty acid salts component to produce the fatty acid by-products of the present invention.

Similarly, the crude glycerin phase typically includes a mixture of glycerin, water and a fatty acid salts component. This fatty acid salts component forms a solution or suspension with the water phase where it can be further separated from the glycerin component by adding any suitable acid to recover the fatty acid by-products suitable for the present invention.

It should be appreciated that the fatty acid by-products of the present invention can be derived from the acidulation of any of the biodiesel manufacturing process streams/stages that contain the fatty acid salts component (e.g. soap water) including, for example, the wash water. These fatty acid by-products derived from any of the different stages/streams of the biodiesel manufacturing process can be used as a valuable component of the beneficiation compositions of the present invention. The fatty acid by-products of biodiesel manufacturing can be produced in ever increased amounts. As a result, the biodiesel manufacturing by-products are inexpensive and their use can be economical and highly effective for a variety of beneficiation technologies.

In an embodiment, the fatty acid by-products from diesel manufacturing can be comprised of free fatty acids and methyl and ethyl esters. Additional components of the by-products can include salts, methanol, ethanol, glycerin, and moisture (e.g. water). The mixture of the free fatty acids can comprise palmitic acid, palmitoleic acid, stearic acid, oleic acid, linoleic acid, linolenic acid, arachidic acid, eicosenoic acid, behenic acid, lignoceric acid, tetracosenic acid and combinations thereof.

In an alternative embodiment, the fatty acid by-product compositions can include one or more $C_6$-$C_{24}$ saturated and unsaturated fatty acids, their salts and methyl and/or ethyl esters. The by-product can further include one or more $C_2$-$C_6$ mono-, di- and tri-hydric alcohols such as, for example, methanol, ethanol, glycerin and glycols. In an embodiment, the by-products contain about 0.01 to about 15 weight percent of the $C_2$-$C_6$ mono-, di- and tri-hydric alcohols.

The by-products can further include one or more inorganic salts such as, for example, salts (e.g. chlorides and sulfates) of sodium, potassium and/or calcium. In an embodiment the by-products contain about 0.05 to about 15 weight percent of the inorganic salts.

The above composition suggests that the by-products can make a perfect hydrobicizing reagent suitable of being used as a collector or promoter in flotation or similar processes. For example, the strongly hydrophobic $C_6$-$C_{24}$ fatty acids contained in the by-products are known to facilitate the attachment of air bubbles during flotation.

Furthermore, the fatty acid by-products can be rich in the unsaturated oleic, linoleic, and linolenic fatty acids. Once these fatty acids coat the processed particles (e.g. during flotation) they can slowly crosslink in the presence of air forming a tenacious hydrophobic layer.

In an alternative embodiment, the fatty acid by-products can further be mixed with additives to supplement and/or improve the separation properties of these beneficiation compositions. Such additives can include one or more green collectors. In an embodiment, the green collectors can comprise nonionic surfactants of low HLB numbers, naturally occurring lipids, modified lipids, hydrophobic polymers and combinations thereof.

The first type of the green collectors can be nonionic surfactants whose HLB numbers are below approximately 15. These include, for example, fatty acids, fatty esters, phosphate esters, hydrophobic polymers, ethers, glycol derivatives, sarcosine derivatives, silicon-based surfactants and polymers, sorbitan derivatives, sucrose and glucose esters and derivatives, lanolin-based derivatives, glycerol esters, ethoxylated fatty esters, ethoxylated amines and amides, ethoxylated linear alcohols, ethoxylated tryglycerides, ethoxylated vegetable oils, ethoxylated fatty acids, etc., and combinations thereof.

The second type of green collectors can be naturally occurring lipids. These are naturally occurring organic molecules that can be isolated from plant and animal cells (and tissues) by extraction with nonpolar organic solvents. Large parts of the molecules are hydrocarbons (or hydrophobes). As a result, they are insoluble in water but soluble in organic solvents such as ether, chloroform, benzene, or an alkane. Thus, the definition of lipids can be based on the physical property (i.e., hydrophobicity and solubility) rather than by structure or chemical composition. Lipids can include, for example, a wide variety of molecules of different structures such as triacylglycerols, steroids, waxes, phospholipids, sphingolipids, terpenes, and carboxylic acids. They can be found in various vegetable oils (e.g., soybean oil, peanut oil, olive oil, linseed oil, sesame oil), fish oils, butter, and animal oils (e.g., lard and tallow).

The triacylglycerols present in the naturally occurring lipids may be considered to be large surfactant molecules with three hydrocarbon tails, which may be too large to be adsorbed in between the hydrocarbon tails of the collector molecules adsorbed or adsorbing on the surface of a mineral. Therefore, the third type of green collectors can be naturally occurring lipid molecules that have been broken by using one of several different molecular restructuring processes.

The acyl groups of the naturally occurring lipids contain an even number of hydrocarbons between 12 and 20, and may be either saturated or unsaturated. The unsaturated acyl groups usually have cis geometry, which is not conducive to forming close-packed monolayers of hydrocarbons. Some of the lipids have higher degrees of unsaturation than others. As a result, it may be desirable to either use the lipids containing a lower degree of unsaturation as they occur in nature, or use the lipids containing a higher degree of unsaturation after hydrogenation. The hydrogenation can decrease the degree of unsaturation of the acyl groups. This technique can be applied to naturally occurring lipids, or after breaking the triacylglycerols present in the naturally occurring lipids to smaller molecules.

The fourth type of green collectors can be hydrophobic polymers such as, for example, polymethylhydrosiloxanes, polysilanes, polyethylene derivatives, and hydrocarbon polymers generated by both ring-opening metathesis and methalocene catalyzed polymerization.

Many of the green collectors can be used in conjunction with appropriate solvents, which include but not limited to, light hydrocarbon oils, petroleum ethers, short-chain alcohols short-chain alcohols whose carbon atom numbers are less than eight, and any other reagents, that can readily dissolve or disperse the green collectors in aqueous media. The light hydrocarbon oils include diesel oil, kerosene, gasoline, petroleum distillate, turpentine, naphthenic oils, etc. The amount of the solvents required depends on the solvation power of the solvents used. In some cases, more than one type of solvents may be used to be more effective or more economical.

In an embodiment, the collector of the present invention comprises a blend of the fatty acid by-product, a green collector, and one or more $C_4$-$C_{16}$ alcohols, aldehydes or esters. In an embodiment, the $C_4$-$C_{16}$ alcohols, aldehydes or esters are 1-propene hydroformylation reaction products. In an embodiment, the $C_4$-$C_{16}$ alcohol is 4-methyl cyclohexane methanol (MCHM). The presence of the $C_4$-$C_{16}$ alcohols, aldehydes or esters facilitates the collector distribution in the flotation slurry. In an embodiment, the collector comprises about 70 to about 80 percent by weight of the fatty acid by-product, about 10 to about 20 percent by weight of a green collector, and about 1 to about 20 percent by weight of $C_4$-$C_{16}$ alcohols, aldehydes or esters.

In an embodiment, the present invention provides methods of enhancing the hydrophobicity of compounds in certain beneficiation processes. For example, the beneficiation compositions comprising the fatty acid by-products can be useful in beneficiation of the following materials including, but not limited to, the group of coal, plastics, sand and gravel, phosphates, diamonds, and other mineral ores or man-made matter. In alternative embodiments, the beneficiation compositions can be used in processes to increase the hydrophobicity of particulate materials, particularly in applications such as flotation resulting in the beneficiation of coal, phosphates, diamond ore, and the like. The beneficiation compositions can also be used in conjunction with other suitable flotation collectors and promoters.

Flotation processes are one of the most widely used methods of separating the valuable material from valueless material present, for example, in particulates or fines. For example, in this process, the fine particles are dispersed in water or other suitable solution and small air bubbles are introduced to the slurry so that hydrophobic particles can be selectively collected on the surface of the air bubbles and exit the slurry (e.g. by rising to the surface) while hydrophilic particles are left behind. The hydrophilic particles can also sink to the bottom of the slurry to be collected as a sludge.

The fatty acid by-products can be used to separate materials, for example, in any suitable flotation process. It should be appreciated that the desired final products can rise to the surface during flotation and/or sink to the bottom, such as in reverse flotation processes. For example, during silica flotation processes, the desired product can sink to the bottom of the slurry and the waste product can rise to the top of the slurry.

In an alternative embodiment, the present invention provides a method of separating a first material from a second material. For example, the method can comprise mixing the first material and the second material in a slurry with a beneficiation composition. The beneficiation composition can comprise one or more fatty acid by-products derived from a biodiesel manufacturing process. The beneficiation composition can also comprise one or more fatty acid by-products of transesterification reactions involving triglycerides. Air bubbles can be provided in the slurry to form bubble-particle aggregates with the first material and the bubble-particle aggregates can be allowed to be separated from the second material. The beneficiation composition can further include a green collector additive mixed with the fatty acid by-product. The green collector additive can be, for example, nonionic surfactants of low HLB numbers, naturally occurring lipids, modified lipids, hydrophobic polymers and combinations thereof.

In alternative embodiments, the fatty acid by-product can be derived from the addition of acid to the fatty acid salts solution of a crude fatty acid alkyl esters phase during the biodiesel manufacturing process and/or derived from the addition of acid to the fatty acid salts solution of a crude glycerin phase during the biodiesel manufacturing process.

In another embodiment, the present invention provides a method of separating hydrophobic and hydrophilic particles in an aqueous slurry. For example, the method can comprise adding a beneficiation composition to the aqueous slurry to increase the hydrophobicity of the hydrophobic particles. The beneficiation composition can comprise one or more fatty acid by-products derived from a biodiesel manufacturing process. The aqueous slurry can be mixed to assist the fatty acid by-product in adsorbing on the surface of the hydrophobic particles so as to increase the hydrophobicity of the hydrophobic particles. Air bubbles can be provided to the aqueous slurry so that the hydrophobic particles collect on the surface of the air bubbles forming bubble-particle aggregates. The bubble-particle aggregates can be allowed to float to the surface of the aqueous slurry to be separated from the hydrophilic particles.

The materials to be separated can have any suitable size. By example and not limitation, the materials can range from 2 mm to 0.04 mm in size. The slurry can also have up to 50% solids. Any suitable mechanical or chemical forces can be used to bring the slurry particles in contact with the beneficiation compositions of the present invention. The floated product and the non-floated tailings can be collected from the present methods.

EXAMPLES

By way of example and not limitation, the following examples are illustrative of various embodiments of the present invention.

Example 1

A sample of coal slurry from a Pennsylvania coal preparation plant was floated in the laboratory using a Denver flotation machine. The tests were designed to determine the utility of the fatty acid by-products as standalone collectors. The frother used in these tests was crude 4-methyl cyclohexane methanol. The fatty acid by-product was the material obtained by acidulation of the biodiesel reactor bottoms and biodiesel wash water. In examples 1 and 2, "tonne" means 1,000 kg (2,204.6 pounds).

The results, Table 1, indicate that the neat fatty acid by-product is a less effective collector than Fuel Oil #2 under the same conditions. However, the performance of the fatty acid by-product becomes similar to that of fuel oil collector when the frother dosage is increased.

TABLE 1

Collector Performance of Fuel Oil #2 and Neat Fatty Acid By-Product Compared

| | MCHM frother, 0.15 kg/tonne | | | | MCHM frother, 0.30 kg/tonne | |
|---|---|---|---|---|---|---|
| Collector | Fuel Oil | | Fatty Acid By-Product | | Fatty Acid By-Product | |
| Dose kg/tonne | Conc. Ash (%) | Combustible Recovery (%) | Conc. Ash (%) | Combustible Recovery (%) | Conc. Ash (%) | Combustible Recovery (%) |
| 0.37 | 9.5 | 54.8 | 13.2 | 27.1 | 10.8 | 57.7 |
| 0.75 | 8.9 | 77.9 | 12.2 | 48.0 | 10.6 | 66.7 |
| 1.50 | 8.6 | 75.2 | 10.4 | 62.2 | 11.3 | 77.7 |

Example 2

Further flotation tests were conducted on a different batch of coal slurry obtained from the same plant using the same test conditions as in Example 1. The frother utilized was crude 4-methyl cyclohexane methanol dosed at 0.15 kg/tonne. The reference flotation performance was again obtained using Fuel Oil #2 collector. Three collector blends were prepared from 80% by weight of the fatty acid by-product, 10% by weight of a green collector additive, and 10% by weight of crude 4-methyl cyclohexane methanol. The collector blends are listed in Table 2 by the green collector name. The results indicate that the collector blends containing 10% of a green collector match or outperform the neat fuel oil collector at the same frother level.

TABLE 2

Collector Performance of Fuel Oil #2 and Fatty Acid By-Product Blends Compared

| Collector Composition | Collector Dose kg/tonne | Conc. Ash (%) | Combustible Recovery (%) |
|---|---|---|---|
| 100% Fuel Oil #2 | 0.75 | 10.9 | 63.9 |
|  | 1.5 | 9.8 | 81.5 |
| 80% Fatty Acid By-Product 10% Canola Oil 10% MCHM | 0.75 | 11.1 | 76.3 |
|  | 1.5 | 11.0 | 84.6 |
| 80% Fatty Acid By-Product 10% Soybean Oil 10% MCHM | 0.75 | 10.8 | 75.9 |
|  | 1.5 | 10.6 | 84.1 |
| 80% Fatty Acid By-Product 10% Sorbitan Monooleate 10% MCHM | 0.75 | 9.6 | 79.5 |
|  | 1.5 | 9.7 | 82.0 |

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of separating a first material from a second material, the method comprising: mixing the first material and the second material in a slurry with a beneficiation composition, wherein the beneficiation composition comprises at least one green collector and at least one fatty acid by-product derived from a biodiesel manufacturing process, or at least one fatty acid by-product derived from transesterification reactions involving triglycerides; providing air bubbles in the slurry to form bubble-particle aggregates with the first material; and allowing the bubble-particle aggregates to be separated from the second material, wherein the fatty acid by-product includes at least one of a methyl ester or ethyl ester and said fatty acid by-product further includes glycerin and unsaponifiable matter and the composition further comprises water and inorganic salt.

2. The method of claim 1, wherein the green collector is selected from the group consisting of nonionic surfactants of low HLB numbers, naturally occurring lipids, modified lipids, hydrophobic polymers and combinations thereof.

3. The method of claim 1, wherein the fatty acid by-product is derived from the addition of acid to the fatty acid salts solution of a crude fatty acid alkyl esters phase during the biodiesel manufacturing process.

4. The method of claim 1, wherein the fatty acid by-product is derived from the addition of acid to the fatty acid salts solution of a crude glycerin phase during the biodiesel manufacturing process.

5. The method of claim 1, wherein the fatty acid by-product is derived from the acidulation of at least one bio diesel manufacturing process stream containing at least one fatty acid salts component.

6. The method of claim 1 wherein the fatty acid by-product is derived from transesterification reactions involving triglycerides.

7. The method of claim 1, wherein the fatty acid by-product further comprises one or more components selected from the group consisting of methyl esters, ethyl esters, salts, methanol, ethanol, glycerin, water and combinations thereof.

8. The method of claim 7, wherein the fatty acid by-product comprises one or more components selected from the group consisting of $C_6$-$C_{24}$ saturated and unsaturated fatty acids, $C_6$-$C_{24}$ saturated and unsaturated fatty acids salts, methyl esters, ethyl esters and combinations thereof.

9. The method of claim 8, wherein the fatty acids are selected from the group consisting of palmitic acid, palmitoleic acid, stearic acid, oleic acid, linoleic acid, linolenic acid, arachidic acid, eicosenoic acid, behenic acid, lignoceric acid, tetracosenic acid and combinations thereof.

10. The method of claim 9, wherein the fatty acid by-product further comprises one or more components selected from the group consisting of $C_2$-$C_6$ mono-, di- and tri-hydric alcohols and combinations thereof.

11. The method of claim 1 wherein the fatty acid by-product comprises about one to about 50 weight percent of one or more methyl esters and about 50 to about 90 weight percent of one or more fatty acids.

12. The method of claim 11 wherein the fatty acid by-product further comprises about 0.01 to about 15 weight percent of one or more $C_2$-$C_6$ mono-, di- or trihydric alcohols or a mixture thereof.

13. The method of claim 12 wherein the fatty acid by-product further comprises about 0.05 to about 15 weight percent of one or more inorganic salts.

14. The method of claim 1 further comprising adding one or more $C_4$-$C_{16}$ alcohols, aldehydes or esters to the slurry.

15. The method of claim 14 wherein the $C_4$-$C_{16}$ alcohol is 4-methyl cyclohexane methanol.

* * * * *